(12) United States Patent
Whitfield

(10) Patent No.: US 6,778,696 B1
(45) Date of Patent: Aug. 17, 2004

(54) INTEGRATED TRADITIONAL AND DIGITAL PHOTOGRAPHIC PROCESSING SYSTEM WITH EXCHANGED FEEDBACK CONTROL

(75) Inventor: Charles H. Whitfield, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 664 days.

(21) Appl. No.: 09/689,192

(22) Filed: Oct. 12, 2000

(51) Int. Cl.[7] .......................... G06K 9/00; G03B 13/00
(52) U.S. Cl. ..................................... 382/162; 396/567
(58) Field of Search ............................... 396/351, 569, 396/570, 604, 622, 625, 632; 355/27, 38, 69; 382/162, 165, 167, 275; 358/452, 504, 505, 518, 527, 530

(56) References Cited

U.S. PATENT DOCUMENTS

| | | | | |
|---|---|---|---|---|
| 3,559,555 A | * | 2/1971 | Street ........................... | 396/569 |
| 3,828,226 A | * | 8/1974 | Pamlenyi ....................... | 355/69 |
| 4,400,439 A | * | 8/1983 | Kashiwagi et al. ........ | 428/478.2 |
| 4,501,480 A | * | 2/1985 | Matsui et al. ................ | 396/569 |
| 4,888,607 A | * | 12/1989 | Stutz et al. ................... | 396/625 |
| 5,291,420 A | | 3/1994 | Matsumoto et al. ......... | 364/525 |
| 5,420,979 A | | 5/1995 | Madden et al. .............. | 395/162 |
| 5,801,813 A | * | 9/1998 | Morimoto et al. ........... | 355/27 |
| 6,222,607 B1 | * | 4/2001 | Szajewski et al. ............ | 355/27 |
| 6,305,853 B1 | * | 10/2001 | Bishay et al. ................. | 396/351 |
| 6,361,225 B1 | * | 3/2002 | Szajewski et al. ........... | 396/604 |

FOREIGN PATENT DOCUMENTS

| | | | | |
|---|---|---|---|---|
| EP | 0 443 443 A2 | 8/1991 | .......... | G03D/13/00 |
| EP | 0 645 677 A1 | 3/1995 | .......... | G03D/13/00 |
| EP | 0 649 060 A1 | 4/1995 | .......... | G03D/13/00 |

* cited by examiner

*Primary Examiner*—Andrew W. Johns
*Assistant Examiner*—Amir Alavi
(74) *Attorney, Agent, or Firm*—Peyton C. Watkins

(57) ABSTRACT

An integrated conventional and digital photographic system for processing and printing images, the system comprises (a) a conventional photographic processing control system having a chemical-based operator for developing chemically processed photographic materials which conventional photographic processing system includes a computer-based process control operator for directing chemical adjustments of the chemical-based operator; and (b) a digital processing system having a digital device with computer-implemented color management thereon for managing color operations of the digital device; wherein the computer-based process control operator transmits process information associated with the conventional photographic processing system to the digital device, and the digital device transmits process information to the computer-based process control operator both of which transmissions are used for controlling undesired variations in either system.

8 Claims, 1 Drawing Sheet

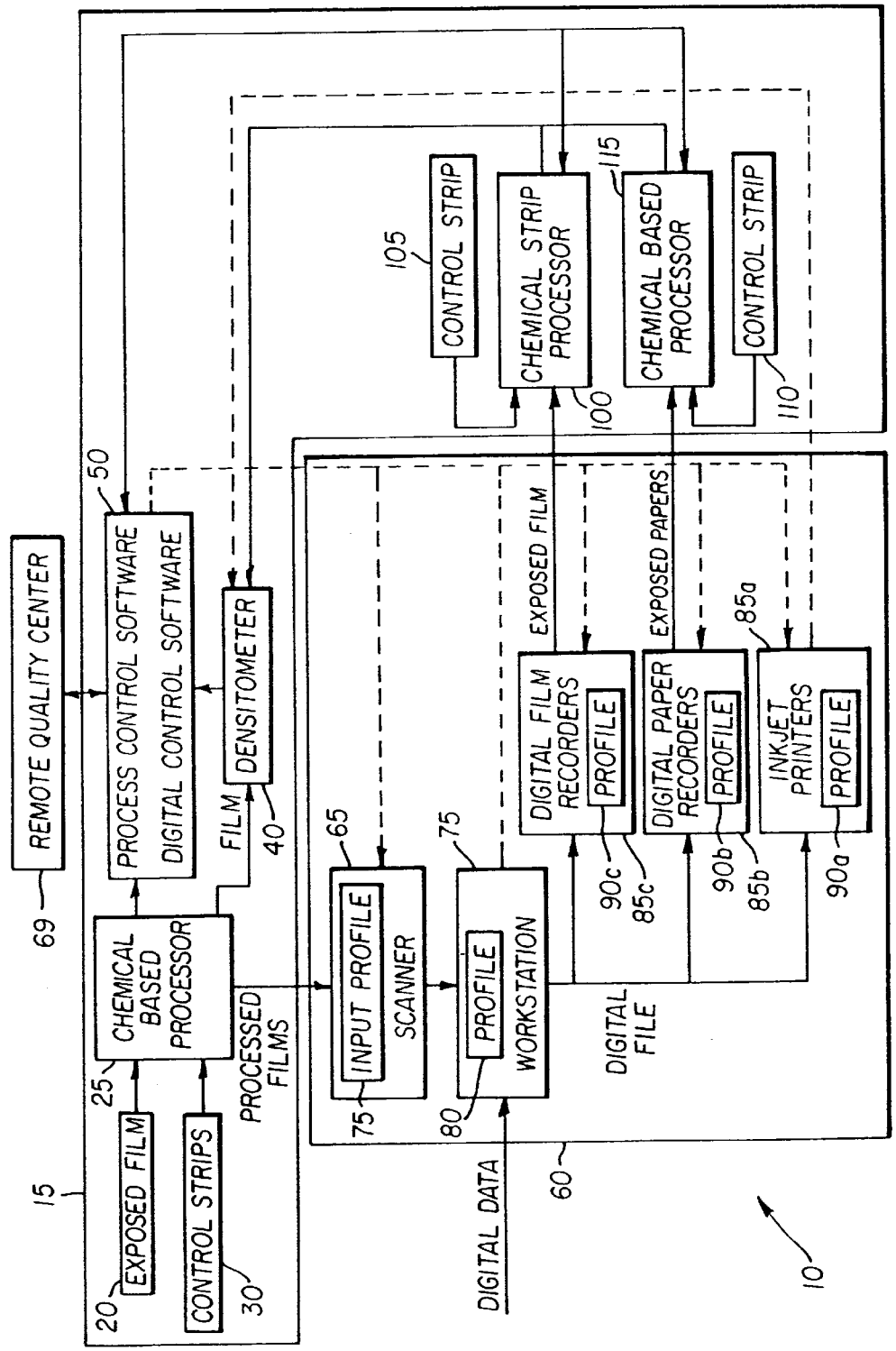

INTEGRATED TRADITIONAL AND DIGITAL PHOTOGRAPHIC PROCESSING SYSTEM WITH EXCHANGED FEEDBACK CONTROL

FIELD OF THE INVENTION

The present invention relates to the field of digital and traditional photographic processing systems, and more particularly, to a combined digital and traditional system which interchanges data between the two systems for producing improved photographic films and prints.

BACKGROUND OF THE INVENTION

Current traditional photographic systems monitor the quality of photographic films and prints by processing a control strip simultaneously with the to-be-developed film. The control strip includes predetermined exposures which will produce predetermined color content on prints upon printing. A densitometer measures the color content of the print produced from the control strip, and if the color content does not match its predetermined color content, process control software, via process control hardware, will adjust the content of the photographic processing chemicals so that the control strip will match its predetermined color content.

Current digital photographic systems control the quality of prints by color management software. For example, a traditional print may be scanned by a digital scanner wherein an input color profile of the color management software will manipulate the color content of images produced by the digital scanner. To produce a print, the digital file is sent to a printer, such as an inkjet printer, in which an output color profile of the color management software will manipulate the color content of the printed images.

Although the currently known and utilized traditional and digital photographic systems are satisfactory, they are not without drawbacks. Currently, the two systems are separate systems and do not interchange data between them so that the process control benefits of one system does not benefit the other system.

Therefore, a need exists for a combined traditional and digital photographic processing system in which process control information is interchanged between them.

SUMMARY OF THE INVENTION

The present invention is directed to overcoming one or more of the problems set forth above. Briefly summarized, according to one aspect of the present invention reside in an integrated conventional and digital photographic system for processing and printing images, the system comprising: a conventional photographic processing control system having a chemical-based operator for developing chemically processed photographic materials which conventional photographic processing system includes a computer-based process control operator for directing chemical adjustments of the chemical-based operator; and a digital processing system having a digital device with computer-implemented color management thereon for managing color operations of the digital device; wherein the computer-based process control operator transmits process information associated with the conventional photographic processing system to the digital device, and the digital device transmits process information to the computer-based process control operator both of which transmissions are used for controlling undesired variations in either system.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of providing the interchange of data between traditional and digital processing systems.

BRIEF DESCRIPTION OF THE DRAWINGS

FIG. 1 is a schematic diagram illustrating the present invention.

DETAILED DESCRIPTION OF THE INVENTION

In the following description, the present invention will be described in the preferred embodiment as a software program. Those skilled in the art will readily recognize that the equivalent of such software may also be constructed in hardware.

Referring to FIG. 1, there is shown a combined digital and traditional photographic processing system 10 illustrating a traditional photographic processing system 15 having an exposed roll of film 20 being inserted into and processed therein. As is well-known in the art, the traditional photographic processing system 15 includes a well-known chemical-based processor 25 having chemicals therein used to convert the exposed film 20 into processed films and will not be discussed in detail herein, i.e., developing silver halide materials. The traditional photographic processing system 15 monitors the quality of photographic development by processing a control strip 30 simultaneously with the to-be-developed exposed film 20. As is well known in the art, the control strip 30 includes predetermined exposures which will produce predetermined color content upon processing. A user measures the color content of the control strip 30 with a densitometer 40. If the color content does not match its predetermined color content, the user inputs the discrepancy into computer-based process having control software therein which operator 50, via process control hardware, will adjust the content of the photographic processing chemicals in the processor 25 so that the color content of the control strip 30 will match its predetermined color. Such adjustments are well known by those skilled in the art. The process control software operator 50 also causes appropriate adjustments to a digital photographic processing system 60, as will be discussed in detail herein below.

A remote quality center 69 receives all of the discrepancy information from the process control software operator 50 for monitoring the quality of traditional picture printing at the particular location. This information is used to inform users of the quality of photographic processing from this particular location and to recommend or remotely make any changes necessary to bring the photographic process into a state of control.

Still referring to FIG. 1, there is illustrated the digital photographic processing system 60. The processed film produced by the traditional photographic processing system is scanned by a digital scanner 65 wherein an input color profile of a color management software 70 will direct and control the color content of images produced by the digital scanner 65. Such color profiles are well-known in the art and will not be discussed. A workstation 75 receives the digital file of the digital image from the scanner 65 or, alternatively, from another digital source, such as from images on a computer disc, for performing any of a plurality of well-known image processing techniques on the digital image. Such manipulations may include tone scale adjustment, contrast manipulation, red-eye removal and the like. The workstation 75 also includes a color profile 80 for directing and controlling the color management of the workstation 75 as it displays images and the like on a monitor.

It is instructive to note that both color profiles 70 and 80 receive feedback data from the computer-based process control operator on the traditional processing discrepancies so that the profiles may adjust its color management scheme accordingly.

To produce an output film or print, the digital file is sent to a digital printer 85 (such as an inkjet printer 85*a*, digital paper recorder 85*b*, or digital film recorder 85*c*) in which an output color profile of the color management software 90 will direct and control the color content of the printed images. In the case of the inkjet printer 85*a*, and after printing, a densitometer 40 measures color content of the print and the results are input into the process control software operator 50. The process control software operator 50 will, in turn, control the composition of the photographic chemicals in the processor 25 so that improved quality prints will be produced by the inkjet printer. The remote quality center 69 also receives the discrepancy information from the process control software operator 50 for monitoring the quality of digital picture printing at the particular location.

In the case of a digital film recorder 85*c*, the exposed film is inserted into and processed by a traditional photographic chemical-based processor 100 which have well-known chemicals, as discussed hereinabove. The processor 100 monitors the quality of photographic films by processing a control strip 105 simultaneously with the exposed film; the function of the control strip 105 is discussed hereinabove. The densitometer 40 measures the color content of the film control strip. If the color content does not match its predetermined color content, process control software operator 50, via process control hardware (not shown), will adjust the content of the photographic processing chemicals in processor 100 so that the control strip will match its predetermined color content. This information is also passed to the quality control center.

In the case of the digital paper recorder 85*b*, the process is substantially the same as for the digital film recorder 85*c*. Exposed paper is processed simultaneously with a control strip 110 through well-known photographic processing techniques having chemicals. Likewise, the densitometer 40 measures the color content of the paper control strip. If the color content does not match its predetermined color content, process control software operator 50, via process control hardware (not shown), will adjust the content of the photographic processing chemicals in a chemical-based processor 115 so that the control strip will match its predetermined color content. This information is also passed to the quality control center.

It is instructive to note that all the color profiles 90 receive feedback data from the computer-based process control software operator 50 on the traditional processing discrepancies so that the profiles may adjust its color management scheme accordingly.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | combined digital and traditional photographic processing system |
| 15 | traditional photographic processing system |
| 20 | exposed roll of film |
| 25 | chemical-based processor |
| 30 | film control strip |
| 40 | densitometer |
| 50 | process control software operator |
| 60 | digital photographic processing system |
| 65 | digital scanner |
| 69 | remote quality center |
| 70 | color profile |
| 75 | workstation |
| 80 | color profile |
| 85a | inkjet printer |
| 85b | digital paper recorder |
| 85c | digital film recorder |
| 90a | color profile |
| 90b | color profile |
| 90c | color profile |
| 100 | chemical-based processor |
| 105 | film control strip |
| 110 | paper control strip |
| 115 | chemical-based processor |

What is claimed is:

1. An integrated conventional and digital photographic system for processing and printing images, the system comprising:

(a) a conventional photographic processing control system having a chemical-based operator for developing chemically processed photographic materials which conventional photographic processing system includes a computer-based process control operator for receiving monitored data, and as a result of the monitored data adjusting content of chemicals in substantially real time of the chemical-based operator; and (b) a digital processing system having a digital device with computer-implemented color management thereon for managing color operations of the digital device; wherein the computer-based process control operator transmits process information associated with the conventional photographic processing system to the digital device, and the digital device transmits process information to the computer-based process control operator both of which transmissions are used for controlling undesired variations in either the digital or conventional system.

2. The system as in claim 1, wherein the digital device is either a digital film recorder, digital paper recorder, an inkjet printer, a scanner or a workstation.

3. The system as in claim 2, further comprising a control center for monitoring data from the digital devices and computer-based process control operator for monitoring and documenting quality of the conventional photographic processing control system digital devices.

4. The method as in claim 2 further comprising the step of providing a control center for monitoring data from the digital devices and computer-based process control operator for monitoring and documenting quality of the conventional photographic processing control system and the digital output devices.

5. The method as in claim 4 further comprising the step of transmitting color control information from the control center to the computer-based process control operator for the purpose of controlling undesired variations in either the digital or conventional system.

6. The system as in claim 1 further comprising a densitometer for measuring color content of digital prints from the digital processing system which content information is input into the computer-based process control operator.

7. A method for processing and printing images, the method comprising the steps of:

(a) providing a conventional photographic processing control system having a chemical-based operator for developing chemically processed photographic materials which conventional photographic processing system includes a computer-based process control operator for receiving monitored data and as a result of the monitored data adjusting content of chemicals in substantially real time of the chemical-based operator;

(b) managing color operations of a digital device of a digital processing system by computer-implemented color management; and (c) transmitting process information associated with the conventional photographic processing system to the digital photographic system, transmitting digital process information to the conventional photographic processing system both of which transmissions are used for controlling undesired variations in either the digital or conventional system.

8. The method as in claim 7 further comprising the step of measuring color content of digital prints from the digital processing system which content information is input into the computer-based process control operator.

* * * * *